US012139595B2

(12) United States Patent
Ongayi et al.

(10) Patent No.: US 12,139,595 B2
(45) Date of Patent: Nov. 12, 2024

(54) LOW COEFFICIENT OF FRICTION ETHYLENE-BASED COMPOSITIONS

(71) Applicant: Dow Global Technologies LLC, Midland, MI (US)

(72) Inventors: Owendi Ongayi, Tarragona (ES); Cosme Llop, Tarragona (ES)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 18/534,066

(22) Filed: Dec. 8, 2023

(65) Prior Publication Data

US 2024/0117166 A1    Apr. 11, 2024

Related U.S. Application Data

(63) Continuation of application No. 16/620,093, filed as application No. PCT/US2018/035952 on Jun. 5, 2018, now Pat. No. 11,879,056.

(30) Foreign Application Priority Data

Jun. 9, 2017    (EP) .................................... 17382356

(51) Int. Cl.
| | |
|---|---|
| *B32B 27/08* | (2006.01) |
| *B32B 27/28* | (2006.01) |
| *B32B 27/32* | (2006.01) |
| *C08L 23/08* | (2006.01) |
| *C08L 83/04* | (2006.01) |

(52) U.S. Cl.
CPC .......... *C08L 23/0815* (2013.01); *B32B 27/08* (2013.01); *B32B 27/283* (2013.01); *B32B 27/32* (2013.01); *C08L 83/04* (2013.01); *B32B 2323/046* (2013.01); *B32B 2383/00* (2013.01); *B32B 2475/00* (2013.01); *C08L 2207/066* (2013.01)

(58) Field of Classification Search
CPC ..... C09J 7/405; C09J 7/38; C09J 7/401; C09J 7/243; C09J 2423/045; C09J 2467/005; C09J 2467/006; C09J 2471/00; C09J 2475/00; C09J 2483/005; B32B 7/06; B32B 7/12; B32B 27/08; B32B 27/306; B32B 27/32; B32B 27/34; B32B 27/36; B32B 27/283; B32B 2405/00; B32B 2255/10; B32B 2255/26; B32B 2270/00; B32B 2274/00; B32B 2307/31; B32B 2307/746; B32B 2439/46; B32B 2439/70; B32B 27/18; B32B 27/308; C08G 77/04; C08L 23/06; C08L 23/08; C08L 2205/035; C08L 23/0815; C09D 183/04
See application file for complete search history.

(56) References Cited

U.S. PATENT DOCUMENTS

2011/0252745 A1 *   10/2011   Breck .................... B32B 27/32
                                                            53/451

\* cited by examiner

*Primary Examiner* — Michael B Nelson
(74) *Attorney, Agent, or Firm* — Boyle Fredrickson, S.C.

(57) ABSTRACT

The present disclosure provides a composition. The composition contains (A) an ethylene-based polymer; and (B) a slip agent blend, the slip agent blend containing (i) from greater than 50 wt % to 99 wt % of a first polydimethylsiloxane having a number average molecular weight (Mn) from 30,000 g/mol to less than 300,000 g/mol; and (ii) from 1 wt % to less than 50 wt % of a second polydimethylsiloxane having a number average molecular weight (Mn) from 300,000 g/mol to 2,000,000 g/mol, based on the total weight of the slip agent blend. The present disclosure also provides a film with a layer containing said composition.

12 Claims, No Drawings

LOW COEFFICIENT OF FRICTION ETHYLENE-BASED COMPOSITIONS

CROSS-REFERENCE TO RELATED APPLICATION

This patent application is a continuation application of US national stage Application No. 16/620,093, filed on Dec. 6, 2019, which is a national stage application of International Patent Application No. PCT/US2018/035952, filed on Jun. 5, 2018, claiming priority to EP application Ser. No. 17/382,356.8 filed on Jun. 9, 2017.

BACKGROUND

The present disclosure relates to ethylene-based compositions containing a slip agent, and films containing the same.

Film layers formed from ethylene-based polymers are used in multilayer films in a variety of applications, including, for example, food packaging and specialty packaging. An ethylene-based polymer outer film layer requires a low coefficient of friction (COF) (e.g., less than 0.35) for efficient processing of the films, such as in a fabrication line or a packaging line. To achieve a low COF, slip agents are typically added to the ethylene-based polymer outer layer. Conventional slip agents include unsaturated fatty acid amides such as erucamide and oleamide, which are known to lower a film's COF by migrating to the surface of the film. However, it is difficult to maintain a consistent low COF using conventional migratory slip agents under different environmental conditions, such as time, elevated temperature, elevated pressure, and various converting processes.

The art recognizes the need for an ethylene-based polymeric composition that exhibits a low COF (e.g., less than 0.35) without a migratory slip agent. The art also recognizes the need for a film that includes an ethylene-based polymeric composition that exhibits a low COF (e.g., less than 0.35) without a migratory slip agent.

SUMMARY

The present disclosure provides a composition. The composition contains (A) an ethylene-based polymer; and (B) a slip agent blend, the slip agent blend containing (i) from greater than 50 wt % to 99 wt % of a first polydimethylsiloxane having a number average molecular weight (Mn) from 30,000 g/mol to less than 300,000 g/mol; and (ii) from 1 wt % to less than 50 wt % of a second polydimethylsiloxane having a number average molecular weight (Mn) from 300,000 g/mol to 2,000,000 g/mol, based on the total weight of the slip agent blend. The present disclosure also provides a film with a layer containing said composition.

The present disclosure also provides a multilayer film. The multi layer film contains at least two layers including a first layer and a second layer in contact with the first layer. The first layer contains (A) an ethylene-based polymer and (B) a slip agent blend, the slip agent blend containing (i) from greater than 50 wt % to 99 wt % of a first polydimethylsiloxane having a number average molecular weight (Mn) from 30,000 g/mol to less than 300,000 g/mol; and (ii) from 1 wt % to less than 50 wt % of a second polydimethylsiloxane having a number average molecular weight (Mn) from 300,000 g/mol to 2,000,000 g/mol, based on the total weight of the slip agent blend. The second layer contains a second ethylene-based polymer. The first layer has a coefficient of friction (COF) from 0.01 to 0.35.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The term "alkenyl" (or "alkenyl group") refers to an organic radical derived from an aliphatic hydrocarbon by removing one hydrogen atom from an alkene group. A nonlimiting example of an alkenyl group is a vinyl group. A "vinyl group" is a —CH=CH$_2$ group.

"Alkoxy" (or "alkoxy group") refers to the —OZ$^1$ radical, where representative Z$^1$ include alkyl, substituted alkyl, cycloalkyl, substituted cycloalkyl, heterocycloalkyl, substituted heterocycloalkyl, silyl groups and combinations thereof. Non limiting examples of suitable alkoxy radicals include methoxy, ethoxy, benzyloxy, and t-butoxy.

The term "alkyl" (or "alkyl group") refers to an organic radical derived from an aliphatic hydrocarbon by removing one hydrogen atom therefrom. An alkyl group may be a linear, branched, cyclic or a combination thereof. The term "substituted alkyl" refers to an alkyl, in which at least one hydrogen atom is substituted with a substituent that comprises at least one heteroatom. Heteroatoms include, but are not limited to, O, N, P and S. Substituents include, but are not limited to, halide, OR', NR'$_2$, PR'$_2$, P(=O)R'$_2$, SiR'$_3$; where each R' is independently a C$_1$-C$_{20}$ hydrocarbyl group.

The term "alkynyl" (or "alkynyl group") refers to an organic radical derived from an aliphatic hydrocarbon by removing one hydrogen atom from an alkyne group.

The term "aryl" (or "aryl group") refers to an organic radical derived from aromatic hydrocarbon by removing one hydrogen atom therefrom. An aryl group may be a monocyclic and/or fused ring system, each ring of which suitably contains from 5 to 7, preferably from 5 or 6 atoms. Structures wherein two or more aryl groups are combined through single bond(s) are also included. Specific examples include, but are not limited to, phenyl, tolyl, naphthyl, biphenyl, anthryl, indenyl, fluorenyl, benzofluorenyl, phenanthryl, triphenylenyl, pyrenyl, perylenyl, chrysenyl, naphtacenyl, fluoranthenyl, and the like. The term "substituted aryl" refers to an aryl, in which at least one hydrogen atom is substituted with a substituent comprising at least one heteroatom. Heteroatoms include, but are not limited to, O, N, P and S. Substituents include, but are not limited to, halide OR', NR'$_2$, PR'$_2$, P(=O)R'$_2$, SiR'$_3$; where each R' is independently a C$_1$-C$_{20}$ hydrocarbyl group.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

A "cycloalkyl" is a saturated cyclic non-aromatic hydrocarbon radical having a single ring or multiple condensed rings. Nonlimiting examples of suitable cycloalkyl radicals include cyclopentyl, cyclohexyl, cyclooctyl, bicyclooctyl, etc. In particular embodiments, cycloalkyls have between 3 and 200 carbon atoms, between 3 and 50 carbon atoms or between 3 and 20 carbon atoms.

An "ethylene-based polymer" is a polymer that contains more than 50 weight percent polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. Ethylene plastomers/elastomers have a density from 0.870 g/cc, or 0.880 g/cc, or 0.890 g/cc to 0.900 g/cc, or 0.902 g/cc, or 0.904 g/cc, or 0.909 g/cc, or 0.910 g/cc, or 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

A "heteroatom" is an atom other than carbon or hydrogen. Nonlimiting examples of suitable heteroatoms include: F, Cl, Br, N, O, P, B, S, Si, Sb, Al, Sn, As, Se and Ge.

"High density polyethylene" (or "HDPE") is an ethylene homopolymer or an ethylene/α-olefin copolymer with at least one $C_4$-$C_{10}$ α-olefin comonomer, or $C_4$-$C_8$ α-olefin comonomer and a density from greater than 0.94 g/cc, or 0.945 g/cc, or 0.95 g/cc, or 0.955 g/cc to 0.96 g/cc, or 0.97 g/cc, or 0.98 g/cc. The HDPE can be a monomodal copolymer or a multimodal copolymer. A "monomodal ethylene copolymer" is an ethylene/$C_4$-$C_{10}$α-olefin copolymer that has one distinct peak in a gel permeation chromatography (GPC) showing the molecular weight distribution. A "multimodal ethylene copolymer" is an ethylene/$C_4$-$C_{10}$α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins (available from The Dow Chemical Company), ELITE™ Enhanced Polyethylene Resins (available from The Dow Chemical Company), CONTINUUM™ Bimodal Polyethylene Resins (available from The Dow Chemical Company), LUPOLEN™ (available from LyondellBasell), as well as HDPE products from Borealis, Ineos, and ExxonMobil.

A "hydrocarbon" is a compound that contains only hydrogen and carbon atoms. The hydrocarbon can be (i) branched or unbranched, (ii) saturated or unsaturated (iii) cyclic or acyclic, and (iv) any combination of (i)-(iii). Nonlimiting examples of hydrocarbons include alkanes, alkenes, and alkynes.

The term "independently," or "each is independently selected from," or like terms refers to the separate selection of an element for each individual member within a target group. For example, the term "for each of Compound 1 through Compound 5, independently, $R_1$ through $R_5$ each independently is selected from methyl, ethyl, and propyl" indicates that (i) the property of a given substituent $R_1$-$R_5$ with respect to each Compound 1-5 is separate and individual (i.e., $R_1$ (methyl) of Compound 1 can be the same or different element as $R_1$ (methyl, ethyl, or propyl) for Compounds 2, 3, 4, or 5) and (ii) the selection for substituents $R_1$ through $R_5$ is separate for each individual substituent (i.e., $R_1$ (ethyl) can be the same or different element with respect to $R_2$, $R_3$, $R_4$, and $R_5$ (methyl, ethyl, or propyl).

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Low density polyethylene" (or "LDPE") consists of ethylene homopolymer, or ethylene/α-olefin copolymer comprising at least one $C_3$-$C_{10}$ α-olefin, preferably $C_3$-$C_4$ that has a density from 0.915 g/cc to 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer or at least one $C_4$-$C_8$ α-olefin comonomer, or at least one $C_6$-$C_8$α-olefin comonomer. LLDPE is characterized by little, if any, long chain branching, in contrast to conventional LDPE. LLDPE has a density from 0.910 g/cc, or 0.915 g/cc, or 0.920 g/cc, or 0.925 g/cc to 0.930 g/cc, or 0.935 g/cc, or 0.940 g/cc. Nonlimiting examples of LLDPE include TUFLIN™ linear low density polyethylene resins (available from The Dow Chemical Company), DOWLEX™ polyethylene resins (available from the Dow Chemical Company), and MARLEX™ polyethylene (available from Chevron Phillips).

"Multi-component ethylene-based copolymer" (or "EPE") comprises units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer, such as described in patent references U.S. Pat. Nos. 6,111,023; 5,677,383; and 6,984,695. EPE resins have a density from 0.905 g/cc, or 0.908 g/cc, or 0.912 g/cc, or 0.920 g/cc to 0.926 g/cc, or 0.929 g/cc, or 0.940 g/cc, or 0.962 g/cc. Nonlimiting examples of EPE resins include ELITE™ enhanced polyethylene (available from The Dow Chemical Company), ELITE AT™ advanced technology resins (available from The Dow Chemical Company), SURPASS™ Polyethylene (PE) Resins (available from Nova Chemicals), and SMART™ (available from SK Chemicals Co.).

An "olefin-based polymer" or "polyolefin" is a polymer that contains more than 50 weight percent polymerized olefin monomer (based on total amount of polymerizable monomers), and optionally, may contain at least one comonomer. A nonliming examples of an olefin-based polymer is ethylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

"Single-site catalyzed linear low density polyethylenes" (or "m-LLDPE") are linear ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. m-LLDPE has density from 0.913 g/cc, or 0.918 g/cc, or 0.920 g/cc to 0.925 g/cc, or 0.940 g/cc. Nonlimiting examples of m-LLDPE include EXCEED™ metallocene PE (available from ExxonMobil Chemical), LUFLEXEN™ m-LLDPE (available from LyondellBasell), and ELTEX™ PF m-LLDPE (available from Ineos Olefins & Polymers).

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$α-olefin comonomer, or at least one $C_4$-$C_8$α-olefin comonomer, or at least one $C_6$-$C_8$α-olefin comonomer. ULDPE and VLDPE each has a density from 0.885 g/cc, or 0.90 g/cc to 0.915 g/cc. Nonlimiting examples of ULDPE and VLDPE include ATTANE™ ultra low density polyethylene resins (available form The Dow Chemical Company) and FLEXOMER™ very low density polyethylene resins (available from The Dow Chemical Company).

TEST METHODS

Coefficient of Friction (COF) is measured according to ISO 8295. The substrate employed for COF determinations is 304 Stainless Steel.

Density is measured in accordance with ASTM D792, Method B. The result is recorded in grams per cubic centimeter (g/cc).

Melt index (MI) (I2) in g/10 min is measured using ASTM D-1238-04 (190° C./2.16 kg).

Differential Scanning Calorimetry (DSC)

Differential Scanning Calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at 190° C.; the melted sample is then air-cooled to room temperature (25° C.). A 3-10 mg, 6 mm diameter specimen is extracted from the cooled polymer, weighed, placed in a light aluminum pan (50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −80° C. at a 10° C./minute cooling rate and held isothermal at −80° C. for 3 minutes. The sample is then heated to 180° C. (this is the "second heat" ramp) at a 10° C./minute heating rate. The cooling and second heating curves are recorded. The values determined are extrapolated onset of melting, Tm, and extrapolated onset of crystallization, Tc. Heat of fusion (Hf) (in Joules per gram), the calculated % crystallinity for polyethylene samples using the following equation: % Crystallinity=((Hf)/292 J/g)×100;

and the calculated % crystallinity for polyethylene samples using the following equation: % Crystallinity=((Hf)/292 J/g)×100.

The heat of fusion (Hf) and the peak melting temperature are reported from the second heat curve. Peak crystallization temperature is determined from the cooling curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in Bernhard Wunderlich, The Basis of Thermal Analysis, in Thermal Characterization of Polymeric Materials 92, 277-278 (Edith A. Turi ed., 2d ed. 1997).

Gel Permeation Chromatography (GPC)

A high temperature gel permeation chromatography (GPC) system, equipped with Robotic Assistant Deliver (RAD) system is used for sample preparation and sample injection. The concentration detector is an Infra-red detector (IR-5) from Polymer Char Inc. (Valencia, Spain). Data collection is performed using a Polymer Char DM 100 Data acquisition box. The carrier solvent is 1,2,4-trichlorobenzene (TCB). The system is equipped with an on-line solvent degas device from Agilent. The column compartment is operated at 150° C. The columns are four Mixed A LS 30 cm, 20 micron columns. The solvent is nitrogen-purged 1,2,4-trichlorobenzene (TCB) containing approximately 200 ppm 2,6-di-t-butyl-4-methylphenol (BHT). The flow rate is 1.0 mL/min, and the injection volume is 200 µl. A "2 mg/mL" sample concentration is prepared by dissolving the sample in N$_2$ purged and preheated TCB (containing 200 ppm BHT), for 2.5 hours at 160° C., with gentle agitation.

The GPC column set is calibrated by running twenty narrow molecular weight distribution polystyrene standards. The molecular weight (MW) of the standards ranges from 580 g/mol to 8,400,000 g/mol, and the standards are contained in six "cocktail" mixtures. Each standard mixture has at least a decade of separation between individual molecular weights. The equivalent polypropylene molecular weights of each PS standard are calculated by using following equation, with reported Mark-Houwink coefficients for polypropylene (Th. G. Scholte, N. L. J. Meijerink, H. M. Schoffeleers, & A. M. G. Brands, J. Appl. Polym. Sci., 29, 3763-3782 (1984)) and polystyrene (E. P. Otocka, R. J. Roe, N. Y. Hellman, & P. M. Muglia, Macromolecules, 4, 507 (1971)):

$$M_{pp} = \left(\frac{K_{PS} M_{PS}^{a_{PS}+1}}{K_{pp}}\right)^{\frac{1}{a_{pp}+1}}, \qquad \text{(Eq 1)}$$

where $M_{pp}$ is PP equivalent MW, $M_{PS}$ is PS equivalent MW, log K and a values of Mark-Houwink coefficients for PP and PS are listed below.

| Polymer | a | log K |
|---|---|---|
| Polypropylene | 0.725 | −3.721 |
| Polystyrene | 0.702 | −3.900 |

A logarithmic molecular weight calibration is generated using a fourth order polynomial fit as a function of elution volume. Number average and weight average molecular weights are calculated according to the following equations:

$$M_n = \frac{\sum^i Wf_i}{\sum^i (Wf_i / M_i)}, \qquad \text{(Eq 2)}$$

$$M_w = \frac{\sum^i (Wf_i * M_i)}{\sum^i (Wf_i)}, \qquad \text{(Eq 3)}$$

where $Wf_i$ and $M_i$ are the weight fraction and molecular weight of elution component i, respectively.

GPC-Triple Detector (PDMS Mw and Mn Measurement)

Weight average molecular weight (Mw) and number average molecular weight (M n) of the polydimethylsiloxane are measured by GPC (Viscotek™ GPC Max) using a triple detection capability. The Viscotek™ TDA305 unit is equipped with a differential refractometer, an online differential pressure viscometer, and low angle light scattering (LALS: 7° and 90° angles of detection). The mobile phase is Toluene HPLC grade. The columns are two PL Gel Mixed C from Varian—(7.5*300 mm, 5 µm particle size) and a PL Gel Guard column from Varian—(7.5*300 mm) 5 fractom Injection volume with a flow of 1 mL/min and a run time of 37 min. The column and detector temperature is 40° C. The software used is Omnisec 4.6.1 (Viscotek™).

The detectors are calibrated by injection of a narrow polystyrene standard (Mw 68,100 g/mol) of a known concentration. Correct run parameters are checked by using a narrow molecular weight distribution polystyrene standard (PS71K). The molecular weight averages must be within the Statistical Process Control (SPC) chart in order to validate the detectors calibration. Typical GPC[3] precision and accuracy (which depends on the refractive index increment) are around 2-3%.

DETAILED DESCRIPTION

The present disclosure provides a composition. The composition contains (A) an ethylene-based polymer and (B) a slip agent blend, the slip agent blend containing (i) from greater than 50 wt % to 99 wt % of a first polydimethylsiloxane having a number average molecular weight (Mn) from 30,000 g/mol to less than 300,000 g/mol; and (ii) from 1 wt % to less than 50 wt % of a second polydimethylsiloxane having a number average molecular weight (Mn) from 300,000 g/mol to 2,000,000 g/mol, based on the total weight of the slip agent blend.

Composition

The present disclosure provides a composition. The composition contains (A) an ethylene-based polymer; and (B) a slip agent blend, the slip agent blend containing (i) from greater than 50 wt % to 99 wt % of a first polydimethylsiloxane having a number average molecular weight (Mn) from 30,000 g/mol to less than 300,000 g/mol; and (ii) from 1 wt % to less than 50 wt % of a second polydimethylsiloxane having a number average molecular weight (Mn) from 300,000 g/mol to 2,000,000 g/mol, based on the total weight of the slip agent blend; and, optionally, (C) an additive.

A. Ethylene-Based Polymer

The composition contains an ethylene-based polymer. Nonlimiting examples of suitable ethylene-based polymer include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, high density polyethylene (HDPE), and combinations thereof. Nonlimiting examples of suitable ethylene-based polymer also include ethylene/α-olefin interpolymer and ethylene/α-olefin copolymer. Nonlimiting examples of suitable α-olefins include $C_3$-$C_{20}$ α-olefins, or $C_4$-$C_{20}$ α-olefins, or $C_3$-$C_{10}$ α-olefins, or $C_4$-$C_{10}$ α-olefins, or $C_4$-$C_8$ α-olefins. Representative α-olefins include propylene, 1-butene, 1-pentene, 1-hexene, 1-heptene and 1-octene. In an embodiment, the ethylene-based polymer does not contain an aromatic comonomer polymerized therein. In an embodiment, the ethylene-based polymer is an ethylene/octene interpolymer.

In an embodiment, the ethylene-based polymer contains greater than 50 wt % units derived from ethylene, or from 51 wt %, or 55 wt %, or 60 wt % to 70 wt %, or 80 wt %, or 90 wt %, or 95 wt %, or 99 wt %, or 100 wt % units derived from ethylene, based on the weight of the ethylene-based polymer. In an embodiment, the ethylene-based polymer contains a reciprocal amount of units derived from an α-olefin comonomer, or from less than 50 wt %, or 49 wt %, or 45 wt %, or 40 wt % to 30 wt %, or 20 wt %, or 10 wt %, or 5 wt %, or 1 wt %, or 0 wt % units derived from an α-olefin comonomer, based on the weight of the ethylene-based polymer.

In an embodiment, the ethylene-based polymer is an ethylene plastomer/elastomer. The ethylene plastomer/elastomer is an ethylene/α-olefin copolymer consisting of units derived from ethylene and a $C_3$-$C_{10}$ α-olefin comonomer, or a $C_4$-$C_8$ α-olefin comonomer, or a $C_6$-$C_8$ α-olefin comonomer and optional additives. In an embodiment, the ethylene plastomer/elastomer is an ethylene/$C_4$-$C_8$ α-olefin copolymer having one, some, or all of the following properties:
  (a) a density from 0.870 g/cc, or 0.880 g/cc, or 0.890 g/cc to 0.900 g/cc, or 0.902 g/cc, or 0.904 g/cc, or 0.909 g/cc, or 0.910 g/cc, or 0.917 g/cc; and/or
  (b) a melt index from a melt index from 0.1 g/10 min, or 1 g/10 min to 1.5 g/10 min, or 2.0 g/10 min, or 3.0 g/10 min, or 5.0 g/10 min, or 6.0 g/10 min, or 8.0 g/10 min, or 10 g/10 min, or 15 g/10 min, or 20 g/10 min, or 30 g/10 min, or 40 g/10 min, or 50 g/10 min, or 100 g/10 min, or 150 g/10 min, or 200 g/10 min, or 250 g/10 min, or 300 g/10 min; and/or
  (c) a melting point (Tm) from 40° C., or 45° C., or 50° C., or 55° C., or 60° C., or 65° C., or 70° C., or 75° C. to 80° C., or 85° C., or 90° C., or 95° C., or 100° C., or 105° C., or 110° C., or 115° C., or 120° C.

In an embodiment, the ethylene plastomer/elastomer is an ethylene/1-octene copolymer with a density of 0.902 g/cc, a melt index of 1.0 g/10 min, and a melting point of 99° C. In a further embodiment, the ethylene plastomer/elastomer is AFFINITY™ PL 1880G, available from The Dow Chemical Company.

In an embodiment, the ethylene-based polymer is a low density polyethylene (LDPE). The LDPE is an ethylene homopolymer or an ethylene/α-olefin copolymer consisting of units derived from ethylene and a $C_3$-$C_{10}$ α-olefin comonomer, or a $C_4$-$C_8$ α-olefin comonomer, or a $C_6$-$C_8$ α-olefin comonomer. The LDPE has one or both of the following properties:
  (a) a density from 0.915 g/cc, or 0.920 g/cc, or 0.925 g/cc to 0.930 g/cc, or 0.935 g/cc, or 0.940 g/cc; and/or
  (b) a melt index from a melt index from 0.1 g/10 min, or 1 g/10 min, or 1.5 g/10 min, or 2.0 g/10 min to 3.0 g/10 min, or 5.0 g/10 min, or 6.0 g/10 min, or 8.0 g/10 min, or 10 g/10 min, or 15 g/10 min, or 20 g/10 min, or 30 g/10 min, or 40 g/10 min, or 50 g/10 min, or 100 g/10 min.

The composition may contain more than one ethylene-based polymer. In an embodiment, the composition includes at least two ethylene-based polymers, wherein each ethylene-based polymer differs from one another compositionally, structurally, and/or physically. In an embodiment, the composition contains an ethylene plastomer/elastomer and a LDPE.

In an embodiment, the composition contains from 70 wt %, or 75 wt %, or 80 wt %, or 85 wt %, or 90 wt % to 93 wt %, or 94 wt %, or 95 wt %, or 96 wt %, or 97 wt %, or 98 wt %, or 99 wt %, or 99.9 wt % ethylene-based polymer, based on the total weight of the composition.

The ethylene-based polymer may comprise two or more embodiments discussed herein.

B. Slip Agent Blend

The composition contains a slip agent blend. The slip agent blend contains (i) from greater than 50 wt % to 99 wt % of a first polydimethylsiloxane having a number average molecular weight (Mn) from 30,000 g/mol to less than 300,000 g/mol; and (ii) from 1 wt % to less than 50 wt % of a second polydimethylsiloxane having a number average molecular weight (Mn) from 300,000 g/mol to 2,000,000 g/mol, based on the total weight of the slip agent blend.

"Polydimethylsiloxane" ("PDMS") is a polymeric organosilicon compound with the following general Structure (I):

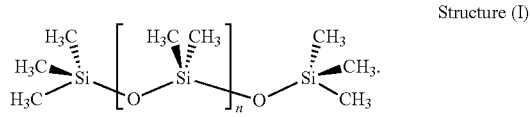

Structure (I)

wherein n is the number of repeating monomer [SiO(CH$_3$)$_2$] units and n is greater than or equal to 2, or from 2 to 20,000. The PDMS may be unsubstituted or substituted. A "substituted PDMS" is a PDMS in which at least one methyl group of Structure (I) is substituted with a substituent. Nonlimiting examples of substituents include halogen atoms (such as chlorine, fluorine, bromine, and iodine); halogen atom-containing groups (such as chloromethyl groups, perfluorobutyl groups, trifluoroethyl groups, and nonafluorohexyl groups); oxygen atom-containing groups (such as hydroxy groups, alkoxy groups (such as methoxy groups and ethoxy groups), (meth)acrylic epoxy groups, and carboxyl groups); nitrogen atom-containing groups (such as amino-functional groups, amido-functional groups, and cyano-functional groups); sulphur atom-containing groups (such as mercapto groups); hydrogen; $C_2$-$C_{10}$ alkyl groups (such as an ethyl group); $C_2$-$C_{10}$ alkynyl groups; alkenyl groups (such as vinyl groups and hexenyl groups); aryl groups (such as phenyl groups and substituted phenyl groups); cycloalkyl groups (such as cyclohexane groups); and combinations thereof. The substituted methyl group may be a terminal methyl group or a non-terminal methyl group. Nonlimiting examples of suitable substituted PDMS include trialkylsilyl terminated PDMS wherein at least one alkyl is a $C_2$-$C_{10}$ alkyl; dialkylhydroxysilyl terminated PDMS; dialkylhydrogensilyl terminated PDMS; dialkylalkenyl silyl terminated PDMS; and dialkylvinylsilyl terminated PDMS. In an embodiment, the substituted PDMS is a dimethylhydroxysilyl terminated PDMS. In another embodiment, the substituted PDMS is a dimethylvinylsilyl terminated PDMS.

In an embodiment, the substituted PDMS excludes nitrogen atom-containing groups. In another embodiment, the substituted PDMS excludes epoxy substituent groups.

In an embodiment, the PDMS is unsubstituted. An "unsubstituted PDMS" is the PDMS of Structure (I) wherein no methyl group in Structure (I) is substituted with a substituent. In an embodiment, the unsubstituted PDMS is a trimethylsilyl terminated PDMS.

(i) First Polydimethylsiloxane

The slip agent blend contains a first polydimethylsiloxane having a number average molecular weight (Mn) from 30,000 g/mol to less than 300,000 g/mol (a "low Mn" PDMS).

In an embodiment, the first PDMS (i.e., the low Mn PDMS) has a number average molecular weight (Mn) from 30,000 g/mol, or 40,000 g/mol, or 45,000 g/mol, or 48,000 g/mol to 49,000 g/mol, or 50,000 g/mol, or 55,000 g/mol, or 60,000 g/mol, or 65,000 g/mol, or 70,000 g/mol, or 75,000 g/mol, or 80,000 g/mol, or 90,000 g/mol, or 100,000 g/mol, or 150,000 g/mol, or 200,000 g/mol, or 250,000 g/mol, or 290,000 g/mol, or less than 300,000 g/mol.

In an embodiment, the low Mn PDMS has a number average molecular weight (Mn) from 30,000 g/mol, or 35,000 g/mol, or 40,000 g/mol, or 45,000 g/mol, or 48,000 g/mol to 49,000 g/mol, or less than 50,000 g/mol.

In an embodiment, the low Mn PDMS has a weight average molecular weight (Mw) from 30,000 g/mol, or 40,000 g/mol, or 45,000 g/mol, or 50,000 g/mol, or 55,000 g/mol, or 60,000 g/mol, or 65,000 g/mol, or 70,000 g/mol, or 75,000 g/mol, or 80,000 g/mol, or 90,000 g/mol, or 100,000 g/mol, or 120,000 g/mol to 130,000 g/mol, or 140,000 g/mol, or 150,000 g/mol, or 200,000 g/mol, or 250,000 g/mol, or 290,000 g/mol, or less than 300,000 g/mol.

In an embodiment, the low Mn PDMS has a molecular weight distribution (Mw/Mn) from 1.0, or 1.5, or 2.0, or 2.1, or 2.2, or 2.3, or 2.4 to 2.5, or 2.6, or 2.7, or 2.8, or 2.9, or 3.0, or 3.5.

In an embodiment, the low Mn PDMS has the Structure (I) and n is from 2, or 5, or 10, or 50, or 100, or 150, or 200, or 250, or 300, or 350, or 400, or 450, or 500, or 550, or 600, or 650 to 700, or 750, or 800, or 850, or 900, or 950, or 1000, or 1100, or 1200, or 1300, or 1400, or 1500, or 1600, or 1700, or 1800, or 1900, or 2000, or 2500, or 3000, or 3500, or 4000, or 4054.

In an embodiment, the low Mn PDMS is a dimethylhydroxysilyl terminated PDMS.

In an embodiment, the low Mn PDMS (such as a dimethylhydroxysilyl terminated PDMS) has a number average molecular weight (Mn) from 30,000 g/mol, or 35,000 g/mol, or 40,000g/mol, or 45,000 g/mol, or 48,000 g/mol to 49,000 g/mol, or 50,000 g/mol; and the low Mn PDMS has one, some, or all of the following properties:
 (a) a weight average molecular weight (Mw) from 50,000 g/mol, or 55,000 g/mol, or 60,000 g/mol, or 65,000 g/mol, or 70,000 g/mol, or 75,000 g/mol, or 80,000 g/mol, or 90,000 g/mol, or 100,000 g/mol, or 120,000 g/mol to 130,000 g/mol, or 150,000 g/mol; and/or
 (b) a molecular weight distribution (Mw/Mn) from 2.2, or 2.3, or 2.4 to 2.5, or 2.6; and/or
 (c) the low Mn PDMS has the Structure (I) and n is from 2, or 5, or 10, or 50, or 100, or 150, or 200, or 250, or 300, or 350, or 400, or 450, or 500, or 550, or 600, or 650 to 700, or 750, or 800, or 850, or 900, or 950, or 1000, or 1100, or 1200, or 1300, or 1400, or 1500, or 1600, or 1700, or 1800, or 1900, or 2000, or 2500, or 3000, or 3500, or 4000, or 4054.

The slip agent blend may contain more than one low Mn PDMS.

The first PDMS (i.e., the low Mn PDMS) may comprise two or more embodiments discussed herein.

(ii) Second Polydimethylsiloxane

The slip agent blend contains a second polydimethylsiloxane having a number average molecular weight (Mn) from 300,000 g/mol to 2,000,000 g/mol (a "high Mn" PDMS).

In an embodiment, the second PDMS (i.e., the high Mn PDMS) has a number average molecular weight (Mn) from 300,000 g/mol, or 310,000 g/mol, or 320,000 g/mol, or 330,000 g/mol, or 340,000 g/mol, or 350,000 g/mol to 360,000 g/mol, or 370,000 g/mol, or 380,000 g/mol, or 390,000 g/mol, or 400,000 g/mol, or 450,000 g/mol, or 500,000 g/mol, or 550,000 g/mol, or 600,000 g/mol, or 750,000 g/mol, or 1,000,000 g/mol, or 1,500,000 g/mol, or 2,000,000 g/mol.

In an embodiment, the high Mn PDMS has a number average molecular weight (Mn) from 300,000 g/mol, or 310,000 g/mol, or 320,000 g/mol, or 330,000 g/mol, or 340,000 g/mol, or 350,000 g/mol to 360,000 g/mol, or 370,000 g/mol, or 380,000 g/mol, or 390,000 g/mol, or 400,000 g/mol, or 450,000 g/mol, or 500,000 g/mol, or 550,000 g/mol.

In an embodiment, the high Mn PDMS has a weight average molecular weight (Mw) from 350,000 g/mol, or 360,000 g/mol, or 370,000 g/mol, or 380,000 g/mol, or 390,000 g/mol, or 400,000 g/mol, or 450,000 g/mol, or 500,000 g/mol, or 600,000 g/mol, or 640,000 g/mol to 650,000 g/mol, or 700,000 g/mol, or 750,000 g/mol, or 800,000 g/mol, or 900,000 g/mol, or 1,000,000 g/mol, or 1,500,000 g/mol, or 2,000,000 g/mol.

In an embodiment, the high Mn PDMS has a molecular weight distribution (Mw/Mn) from 1.0, or 1.5, or 1.8 to 1.9, or 2.0, or 2.1, or 2.2, or 2.3, or 2.4, or 2.5, or 2.6, or 2.7, or 2.8, or 2.9, or 3.0.

In an embodiment, the high Mn PDMS has the Structure (I) and n is greater than 4054, or from 4054, or 4500 to 5000, or 5500, or 6000, or 6500, or 7000, or 7500, or 8000, or 8500, or 9000, or 9500, or 10000, or 11000, or 12000, or 13000, or 14000, or 15000, or 16000, or 17000, or 18000, or 19000, or 20000, or 21000, or 22000, or 23000, or 24000, or 25000, or 26000, or 27000, or 27027.

In an embodiment, the high Mn PDMS is a dimethylvinylsilyl terminated PDMS.

In an embodiment, the high Mn PDMS (such as a dimethylvinylsilyl terminated PDMS) has a number average molecular weight (Mn) from 300,000 g/mol, or 310,000 g/mol, or 320,000 g/mol, or 330,000 g/mol, or 340,000 g/mol, or 350,000 g/mol to 360,000 g/mol, or 370,000 g/mol, or 380,000 g/mol, or 390,000 g/mol, or 400,000 g/mol, or 450,000 g/mol, or 500,000 g/mol, or 550,000 g/mol; and the high Mn PDMS has one, some, or all of the following properties:
 (a) a weight average molecular weight (Mw) from 400,000 g/mol, or 450,000 g/mol, or 500,000 g/mol, or 600,000 g/mol, or 640,000 g/mol to 650,000 g/mol, or 700,000 g/mol, or 750,000 g/mol, or 800,000 g/mol, or 900,000 g/mol, or 1,000,000 g/mol; and/or (b) a molecular weight distribution (Mw/Mn) from 1.5, or 1.8 to 1.9, or 2.0, or 2.1; and/or (c) the high Mn PDMS has the Structure (I) and n is greater than 4054, or from 4054, or 4500 to 5000, or 5500, or 6000, or 6500, or 7000, or 7500, or 8000, or 8500, or 9000, or 9500, or 10000, or 11000, or 12000, or 13000, or 14000, or 15000, or 16000, or 17000, or 18000, or 19000, or 20000, or 21000, or 22000, or 23000, or 24000, or 25000, or 26000, or 27000, or 27027.

The slip agent blend may contain more than one high Mn PDMS.

The second PDMS (i.e., the high Mn PDMS) may comprise two or more embodiments discussed herein.

In an embodiment, the composition contains from 0.1 wt %, or 0.2 wt %, or 0.3 wt %, or 0.4 wt %, or 0.5 wt %, or 1.0 wt %, or 1.5 wt %, or 1.8 wt % to 2.0 wt %, or 2.3 wt %, or 2.5 wt %, or 2.8 wt %, or 3.0 wt %, or 3.5 wt %, or 4.0 wt %, or 4.5 wt %, or 5.0 wt % of the slip agent blend, based on the total weight of the composition. In another embodiment, the composition contains from 0.5 wt %, or 1.0 wt % to 1.5 wt %, or 2.0 wt % of the slip agent blend, based on the total weight of the composition. In another embodiment, the composition contains from 0.5 wt %, or 0.8 wt %to 1.0 wt %, or 1.5 wt %, or 2.0 wt % of the slip agent blend, based on the total weight of the composition. The first PDMS (i.e., the low Mn PDMS) and the second PDMS (i.e., the high Mn PDMS) may be included in the composition as part of a masterbatch in which one or both of the PDMS components is dispersed in a polymer matrix (such as a LDPE matrix). However, the amount of slip agent blend included in the composition refers only to the amount of the first PDMS (i.e., the low Mn PDMS) and the second PDMS (i.e., the high Mn PDMS) included in the composition, and excludes the weight of the polymer matrix of any PDMS masterbatch. In other words, the amount of slip agent blend refers to the combined amount of the first PDMS (i.e., the low Mn PDMS) and the second PDMS (i.e., the high Mn PDMS) included in the composition.

In an embodiment, the composition contains from greater than 0.05 wt %, or 0.08 wt %, or 0.10 wt %, or 0.20 wt %, or 0.30 wt %, or 0.40 wt %, or 0.50 wt %, or 0.80 wt %, or 1.00 wt %, or 1.10 wt %, or 1.20 wt %, or 1.30 wt %, or 1.40 wt %, or 1.50 wt % to 1.60 wt %, or 1.70 wt %, or 1.80 wt %, or 1.90 wt %, or 2.00 wt %, or 2.50 wt %, or 3.00 wt %, or 3.50 wt %, or 4.00 wt %, or 4.50 wt %, or 4.95 wt % of the first PDMS (i.e., the low Mn PDMS), based on the total weight of the composition.

In an embodiment, the composition contains from 0.01 wt %, or 0.05 wt %, or 0.10 wt %, or 0.20 wt %, or 0.30 wt %, or 0.40 wt %, or 0.50 wt % to 0.60 wt %, or 0.70 wt %, or 0.80 wt %, or 0.90 wt %, or 1.00 wt %, or 1.50 wt %, or 2.00 wt %, or 2.30 wt %, or 2.40 wt %, or less than 2.50 wt % of the second PDMS (i.e., the high Mn PDMS), based on the total weight of the composition.

The slip agent blend contains from greater than 50 wt % to 99 wt % of the first PDMS (i.e., the low Mn PDMS) and from 1 wt % to less than 50 wt % of the second PDMS (i.e., the high Mn PDMS), based on the total weight of the slip agent blend (i.e., based on the combined amount of the first PDMS (i.e., the low Mn PDMS) and the second PDMS (i.e., the high Mn PDMS)). In an embodiment, the slip agent blend contains from greater than 50 wt %, or 51 wt %, or 55 wt %, or 60 wt %, or 65 wt %, or 70 wt %, or 75 wt % to 80 wt %, or 85 wt %, or 90 wt %, or 95 wt %, or 98 wt %, or 99 wt % of the first PDMS (i.e., the low Mn PDMS), and a reciprocal amount of the second PDMS, or from 1 wt %, or 2 wt %, or 5 wt %, or 10 wt %, or 15 wt %, or 20 wt % to 25 wt %, or 30 wt %, or 35 wt %, or 40 wt %, or 45 wt %, or 49 wt %, or less than 50 wt % of the second PDMS (i.e., the high Mn PDMS), based on the total weight of the slip agent blend. The combined amount of the first PDMS and the second PDMS yields a slip agent blend of 100 wt %.

In an embodiment, the weight ratio of the first PDMS (i.e., the low Mn PDMS) to the second PDMS (i.e., the high Mn PDMS) is from 1.1:1, or 1.5:1, or 2.0:1, or 3.0:1 to 4.0:1, or 5.0:1, or 10:1, or 15:1, or 20:1, or 25:1, or 30:1, or 40:1, or 50:1, or 60:1, or 70:1, or 80:1, or 90:1, or 99:1. In an embodiment, the weight ratio of the first PDMS (i.e., the low Mn PDMS) to the second PDMS (i.e., the high Mn PDMS) is 3:1.

The slip agent blend may comprise two or more embodiments discussed herein.

C. Optional Additive(s)

In an embodiment, the composition includes one or more optional additives. Nonlimiting examples of suitable additive include antiblock agents, antioxidants, antistatic agents, stabilizing agents, nucleating agents, colorants, pigments, ultra violet (UV) absorbers or stabilizers, flame retardants, compatibilizers, plasticizers, fillers, processing aids, antifog additive, crosslinking agents (e.g., peroxides), and combinations thereof.

In an embodiment, the composition includes an antiblock agent. An "antiblock agent" is a compound that minimizes, or prevents, blocking (i.e., adhesion) between two adjacent layers of film by creating a microscopic roughening of the film layer surface, which reduces the available contact area between adjacent layers. The antiblock agent may be organic or inorganic. Nonlimiting examples of suitable antiblock agents include silica, talc, calcium carbonate, and combinations thereof. In an embodiment, the antiblock agent is silica ($SiO_2$). The silica may be organic silica or synthetic silica. In another embodiment, the antiblock agent is talc.

In an embodiment, the composition contains from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt %, or 4.0 wt %, or 5.0 wt % additive, based on the total weight of the composition.

In an embodiment, the composition contains, consists essentially of, or consists of:

(A) from 70 wt %, or 75 wt %, or 80 wt %, or 85 wt %, or 90 wt % to 93 wt %, or 94 wt %, or 95 wt %, or 96 wt %, or 97 wt %, or 98 wt %, or 99 wt %, or 99.9 wt % ethylene-based polymer (such as an ethylene plastomer/elastomer, a LDPE, or combinations thereof), based on the total weight of the composition;

(B) from 0.1 wt %, or 0.2 wt %, or 0.3 wt %, or 0.4 wt %, or 0.5 wt %, or 1.0 wt %, or 1.5 wt %, or 1.8 wt % to 2.0 wt %, or 2.3 wt %, or 2.5 wt %, or 2.8 wt %, or 3.0 wt %, or 3.5 wt %, or 4.0 wt %, or 4.5 wt %, or 5.0 wt % slip agent blend, based on the total weight of the composition; and (C) optionally, from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt %, or 4.0 wt %, or 5.0 wt % additive, based on the total weight of the composition; and the slip agent blend contains:

(i) from greater than 50 wt %, or 51 wt %, or 55 wt %, or 60 wt %, or 65 wt %, or 70 wt %, or 75 wt % to 80 wt %, or 85 wt %, or 90 wt %, or 95 wt %, or 98 wt %, or 99 wt % of a first PDMS (such as a dimethylhydroxysilyl terminated PDMS) having a Mn from 30,000 g/mol, or 40,000 g/mol, or 45,000 g/mol, or 48,000 g/mol to 49,000 g/mol, or 50,000 g/mol, or 55,000 g/mol, or 60,000 g/mol, or 65,000 g/mol, or 70,000 g/mol, or 75,000 g/mol, or 80,000 g/mol, or 90,000 g/mol, or 100,000 g/mol, or 150,000 g/mol, or 200,000 g/mol, or 250,000 g/mol, or 290,000 g/mol, or less than 300,000 g/mol, based on the total weight of the slip agent blend; and (ii) from 1 wt %, or 2 wt %, or 5 wt %, or 10 wt %, or 15 wt %, or 20 wt % to 25 wt %, or 30 wt %, or 35 wt %, or 40 wt %, or 45 wt %, or 49 wt %, or less than 50 wt % of a second PDMS (such as a dimethylvinylsilyl terminated PDMS) having a Mn from 300,000 g/mol, or 310,000 g/mol, or 320,000 g/mol, or 330,000 g/mol, or 340,000 g/mol, or 350,000 g/mol to 360,000 g/mol, or 370,000 g/mol, or 380,000 g/mol, or 390,000 g/mol, or 400,000 g/mol, or 450,000 g/mol, or 500,000 g/mol, or 550,000 g/mol, or 600,000 g/mol, or 750,000 g/mol, or 1,000,000 g/mol, or 1,500,000 g/mol, or 2,000,000 g/mol, based on the total weight of the slip agent blend.

In an embodiment, the composition contains, consists essentially of, or consists of:

(1) from 70 wt %, or 75 wt %, or 80 wt %, or 85 wt %, or 90 wt % to 93 wt %, or 94 wt %, or 95 wt %, or 96 wt %, or 97 wt %, or 98 wt %, or 99 wt %, or 99.9 wt % ethylene-based polymer (such as an ethylene plastomer/elastomer, a LDPE, or combinations thereof), based on the total weight of the composition;

(2) from greater than 0.05 wt %, or 0.08 wt %, or 0.10 wt %, or 0.20 wt %, or 0.30 wt %, or 0.40 wt %, or 0.50 wt %, or 0.80 wt %, or 1.00 wt %, or 1.10 wt %, or 1.20 wt %, or 1.30 wt %, or 1.40 wt %, or 1.50 wt % to 1.60 wt %, or 1.70 wt %, or 1.80 wt %, or 1.90 wt %, or 2.00 wt %, or 2.50 wt %, or 3.00 wt %, or 3.50 wt %, or 4.00 wt %, or 4.50 wt %, or 4.95 wt % of a first PDMS (such as a dimethylhydroxysilyl terminated PDMS) having a Mn from 30,000 g/mol, or 40,000 g/mol, or 45,000 g/mol, or 48,000 g/mol to 49,000 g/mol, or 50,000 g/mol, or 55,000 g/mol, or 60,000 g/mol, or 65,000 g/mol, or 70,000 g/mol, or 75,000 g/mol, or 80,000 g/mol, or 90,000 g/mol, or 100,000 g/mol, or 150,000 g/mol, or 200,000 g/mol, or 250,000 g/mol, or 290,000 g/mol, or less than 300,000 g/mol, based on the total weight of the composition;

(3) from 0.01 wt %, or 0.05 wt %, or 0.10 wt %, or 0.20 wt %, or 0.30 wt %, or 0.40 wt %, or 0.50 wt % to 0.60 wt %, or 0.70 wt %, or 0.80 wt %, or 0.90 wt %, or 1.00 wt %, or 1.50 wt %, or 2.00 wt %, or 2.30 wt %, or 2.40 wt %, or less than 2.50 wt % of a second PDMS (such as a dimethylvinylsilyl terminated PDMS) having a Mn from 300,000 g/mol, or 310,000 g/mol, or 320,000 g/mol, or 330,000 g/mol, or 340,000 g/mol, or 350,000 g/mol to 360,000 g/mol, or 370,000 g/mol, or 380,000 g/mol, or 390,000 g/mol, or 400,000 g/mol, or 450,000 g/mol, or 500,000 g/mol, or 550,000 g/mol, or 600,000 g/mol, or 750,000 g/mol, or 1,000,000 g/mol, or 1,500,000 g/mol, or 2,000,000 g/mol, based on the total weight of the composition; and (4) optionally, from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt %, or 4.0 wt %, or 5.0 wt % additive, based on the total weight of the composition; and the weight ratio of the first PDMS to the second PDMS is from 1.5:1, or 2.0:1, or 3.0:1 to 4.0:1, or 5.0:1, or 10:1, or 15:1, or 20:1, or 25:1, or 30:1, or 40:1, or 50:1, or 60:1, or 70:1, or 80:1, or 90:1, or 99:1.

It is understood that the sum of the components in each of the compositions disclosed herein, including the foregoing compositions, yields 100 weight percent (wt %), based on the total weight of the composition.

In an embodiment, the composition excludes a migratory slip agent, such as an unsaturated fatty acid amide (e.g., erucamide and oleamide).

In an embodiment, a film with a layer containing the composition has a coefficient of friction (COF) from 0.01, or 0.05, or 0.10, or 0.20, or 0.25 to 0.27, or 0.28, or 0.29, or 0.30, or 0.35.

The composition may comprise two or more embodiments discussed herein.

Film

The present disclosure also provides a film. In an embodiment, the film includes a layer containing any embodiment of the present composition. The film may be a monolayer film or a multilayer film. The multilayer film contains two layers, or more than two layers. For example, the multilayer film can have two, three, four, five, six, seven, eight, nine, ten, eleven, or more layers. In an embodiment, the multilayer film contains only two layers, or only three layers.

In an embodiment, the film is a multilayer film with at least two layers including a first layer and a second layer in contact with the first layer. The first layer contains (A) an ethylene-based polymer and (B) a slip agent blend, the slip agent blend containing (i) from greater than 50 wt % to 99 wt % of a first polydimethylsiloxane having a number average molecular weight (Mn) from 30,000 g/mol to less than 300,000 g/mol; and (ii) from 1 wt % to less than 50 wt % of a second polydimethylsiloxane having a number average molecular weight (Mn) from 300,000 g/mol to 2,000,000 g/mol, based on the total weight of the slip agent blend. The second layer contains a second ethylene-based polymer. The first layer has a coefficient of friction (COF) from 0.01 to 0.35. In an embodiment, the multilayer film includes an optional third layer in contact with the second layer.

1. First Layer

The multilayer film includes a first layer. The first layer contains (A) an ethylene-based polymer and (B) a slip agent blend, the slip agent blend containing (i) from greater than 50 wt % to 99 wt % of a first polydimethylsiloxane having a number average molecular weight (Mn) from 30,000 g/mol to less than 300,000 g/mol; and (ii) from 1 wt % to less than 50 wt % of a second polydimethylsiloxane having a number average molecular weight (Mn) from 300,000 g/mol to 2,000,000 g/mol, based on the total weight of the slip agent blend. The first layer may contain any composition disclosed herein.

In an embodiment, the first layer excludes a migratory slip agent, such as an unsaturated fatty acid amide (e.g., erucamide and oleamide).

The first layer has two opposing surfaces. In an embodiment, the first layer is a continuous layer with two opposing surfaces.

The first layer has a coefficient of friction (COF) from 0.01, or 0.05, or 0.10, or 0.20, or 0.25 to 0.27, or 0.28, or 0.29, or 0.30, or 0.35.

In an embodiment, the first layer has a thickness from 5 μm, or 8 μm, or 10 μm to 15 μm, or 20 μm, or 25 μm, or 30 μm, or 35 μm, or 40 μm, or 45 μm, or 50 μm.

In an embodiment, the first layer is from 10 vol %, or 15 vol %, or 20 vol % to 25 vol %, or 30 vol %, or 40 vol %, or 50 vol %, or 60 vol %, or 70 vol %, or 80 vol %, or 90 vol %, or 95 vol % of the film, based on the total volume of the film.

In an embodiment, the first layer is a skin layer. A "skin layer" is an outermost layer of a film structure. In other words, at least one surface of a skin layer is an outermost surface of the film.

In an embodiment, the first layer is a sealant layer.

The first layer may comprise two or more embodiments discussed herein.

2. Second Layer

The multilayer film includes a second layer. The second layer contains a second ethylene-based polymer.

The second layer has two opposing surfaces. In an embodiment, the second layer is a continuous layer with two opposing surfaces.

The second layer is in contact with the first layer. The second layer may be in direct contact or in indirect contact with the first layer. In an embodiment, the second layer directly contacts the first layer. The term "directly contacts," as used herein, is a layer configuration whereby the second layer is located immediately adjacent to the second layer and no intervening layers, or no intervening structures, are present between the first layer and the second layer. In another embodiment, the second layer indirectly contacts the first layer. The term "indirectly contacts," as used herein, is a layer configuration whereby an intervening layer, or an intervening structure, is present between the first layer and the second layer.

The second ethylene-based polymer may be any ethylene-based polymer disclosed herein. The second ethylene-based polymer may be the same or different than the ethylene-based polymer of the first layer. In an embodiment, the second ethylene-based polymer is the same as the ethylene-based polymer of the first layer. In another embodiment, the second ethylene-based polymer is different than the ethylene-based polymer of the first layer.

In an embodiment, the second ethylene-based polymer is a linear low density polyethylene (LLDPE), a low density polyethylene (LDPE), or a combination thereof. In a further embodiment, the LLDPE is an ethylene/1-octene copolymer.

In an embodiment, the second layer contains from 1 wt %, or 5 wt %, or 10 wt %, or 20 wt %, or 30 wt %, or 40 wt %, or 50 wt % to 60 wt %, or 70 wt %, or 80 wt %, or 90 wt %, or 95 wt %, or 99 wt % LLDPE; and a reciprocal amount of LDPE, or from 1 wt %, or 5 wt %, or 10 wt %, or 20 wt %, or 30 wt %, or 40 wt %, or 50 wt % to 60 wt %, or 70 wt %, or 80 wt %, or 90 wt %, or 95 wt %, or 99 wt % LDPE, based on the total weight of the second layer.

In an embodiment, the second layer contains an optional additive. The additive may be any additive disclosed herein. In an embodiment, the second layer contains from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt %, or 4.0 wt %, or 5.0 wt % additive, based on the total weight of the second layer.

In an embodiment, the second layer has a thickness from 5 μm, or 8 μm, or 10 μm, or 15 μm, or 20 μm, or 25 μm, or 30 μm to 35 μm, or 40 μm, or 45 μm, or 50 μm, or 55 μm, or 60 μm, or 65 μm, or 70 μm, or 75 μm, or 80 μm.

In an embodiment, the second layer is from 10 vol %, or 15 vol %, or 20 vol %, or 25 vol %, or 30 vol %, or 40 vol %, or 50 vol %, or 60 vol % to 65 vol %, or 70 vol %, or 80 vol %, or 90 vol % of the film, based on the total volume of the film.

The second layer may be a skin layer or a core layer. In an embodiment, the second layer is a core layer. A "core layer" is a layer of a film structure that is an inner layer. In other words, neither surface of a core layer is an outer surface of the film.

The second layer may comprise two or more embodiments discussed herein.

3. Optional Third Layer

In an embodiment, the multilayer film includes a third layer. The third layer contains a third ethylene-based polymer.

The third layer has two opposing surfaces. In an embodiment, the third layer is a continuous layer with two opposing surfaces.

The third layer is in contact with the second layer. The third layer may be in direct contact or in indirect contact with the second layer. In an embodiment, the third layer directly contacts the second layer. In another embodiment, the third layer indirectly contacts the second layer.

The third ethylene-based polymer may be any ethylene-based polymer disclosed herein. The third ethylene-based polymer may be the same or different than the ethylene-based polymer of the first layer, and the third ethylene-based polymer may be the same or different than the second ethylene-based polymer of the second layer. In an embodiment, the third ethylene-based polymer is the same as the second ethylene-based polymer of the second layer. In another embodiment, the third ethylene-based polymer is different than the second ethylene-based polymer of the second layer.

In an embodiment, the third ethylene-based polymer is a linear low density polyethylene (LLDPE), a low density polyethylene (LDPE), or a combination thereof. In a further embodiment, the LLDPE is an ethylene/1-octene copolymer.

In an embodiment, the third layer contains from 1 wt %, or 5 wt %, or 10 wt %, or 20 wt %, or 30 wt %, or 40 wt %, or 50 wt % to 60 wt %, or 70 wt %, or 80 wt %, or 90 wt %, or 95 wt %, or 99 wt % LLDPE; and a reciprocal amount of LDPE, or from 1 wt %, or 5 wt %, or 10 wt %, or 20 wt %, or 30 wt %, or 40 wt %, or 50 wt % to 60 wt %, or 70 wt %, or 80 wt %, or 90 wt %, or 95 wt %, or 99 wt % LDPE, based on the total weight of the third layer.

In an embodiment, the third layer contains an optional additive. The additive may be any additive disclosed herein. In an embodiment, the third layer contains from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt %, or 4.0 wt %, or 5.0 wt % additive, based on the total weight of the third layer.

In an embodiment, the third layer has a thickness from 5 μm, or 8 μm, or 10 μm to 15 μm, or 20 μm, or 25 μm, or 30 μm, or 35 μm, or 40 μm, or 45 μm, or 50 μm.

In an embodiment, the third layer is from 10 vol %, or 15 vol %, or 20 vol % to 25 vol %, or 30 vol %, or 40 vol %, or 50 vol %, or 60 vol %, or 70 vol %, or 80 vol %, or 90 vol %, or 95 vol % of the film, based on the total volume of the film.

In an embodiment, the third layer is a skin layer. In another embodiment, the third layer is a core layer.

The third layer may comprise two or more embodiments discussed herein.

In an embodiment, the multilayer film has the following Structure (II):

first layer/second layer Structure (II).

In an embodiment, the multilayer film has the following Structure (III):

first layer/second layer/third layer Structure (III).

In an embodiment, the first layer and the third layer are skin layers on opposing sides of the second layer, which is a core layer. In a further embodiment, the first layer is in direct contact with the second layer, and the second layer is in direct contact with the third layer.

In an embodiment, the multilayer film consists essentially of, or consists of, the first layer and the second layer. In another embodiment, the multilayer film consists essentially of, or consists of, the first layer, the second layer, and the third layer.

In an embodiment, the multilayer film has a thickness of from 15 µm, or 20 µm, or 25 µm, or 30 µm, or 35 µm, or 40 µm, or 45 µm, or 50 µm to 55 µm, or 60 µm, or 65 µm, or 70 µm, or 75 µm, or 80 µm, or 85 µm, or 90 µm, or 95 µm, or 100 µm.

In an embodiment, the multilayer film includes at least two layers including, consisting essentially of, or consisting of:
(1) a first layer containing, consisting essentially of, or consisting of
  (A) from 70 wt %, or 75 wt %, or 80 wt %, or 85 wt %, or 90 wt % to 93 wt %, or 94 wt %, or 95 wt %, or 96 wt %, or 97 wt %, or 98 wt %, or 99 wt %, or 99.9 wt % ethylene-based polymer (such as an ethylene plastomer/elastomer, a LDPE, or combinations thereof), based on the total weight of the first layer;
  (B) from 0.1 wt %, or 0.2 wt %, or 0.3 wt %, or 0.4 wt %, or 0.5 wt %, or 1.0 wt %, or 1.5 wt %, or 1.8 wt % to 2.0 wt %, or 2.3 wt %, or 2.5 wt %, or 2.8 wt %, or 3.0 wt %, or 3.5 wt %, or 4.0 wt %, or 4.5 wt %, or 5.0 wt % slip agent blend, based on the total weight of the first layer; and
  (C) optionally, from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt %, or 4.0 wt %, or 5.0 wt % additive, based on the total weight of the first layer; and
the slip agent blend contains:
  (i) from greater than 50 wt %, or 51 wt %, or 55 wt %, or 60 wt %, or 65 wt %, or 70 wt %, or 75 wt % to 80 wt %, or 85 wt %, or 90 wt %, or 95 wt %, or 98 wt %, or 99 wt % of a first PDMS (such as a dimethylhydroxysilyl terminated PDMS) having a Mn from 30,000 g/mol, or 40,000 g/mol, or 45,000 g/mol, or 48,000 g/mol to 49,000 g/mol, or 50,000 g/mol, or 55,000 g/mol, or 60,000 g/mol, or 65,000 g/mol, or 70,000 g/mol, or 75,000 g/mol, or 80,000 g/mol, or 90,000 g/mol, or 100,000 g/mol, or 150,000 g/mol, or 200,000 g/mol, or 250,000 g/mol, or 290,000 g/mol, or less than 300,000 g/mol, based on the total weight of the slip agent blend; and
  (ii) from 1 wt %, or 2 wt %, or 5 wt %, or 10 wt %, or 15 wt %, or 20 wt % to 25 wt %, or 30 wt %, or 35 wt %, or 40 wt %, or 45 wt %, or 49 wt %, or less than 50 wt % of a second PDMS (such as a dimethylvinylsilyl terminated PDMS) having a Mn from 300,000 g/mol, or 310,000 g/mol, or 320,000 g/mol, or 330,000 g/mol, or 340,000 g/mol, or 350,000 g/mol to 360,000 g/mol, or 370,000 g/mol, or 380,000 g/mol, or 390,000 g/mol, or 400,000 g/mol, or 450,000 g/mol, or 500,000 g/mol, or 550,000 g/mol, or 600,000 g/mol, or 750,000 g/mol, or 1,000,000 g/mol, or 1,500,000 g/mol, or 2,000,000 g/mol, based on the total weight of the slip agent blend;
(2) a second layer in contact with the first layer, the second layer containing a second ethylene-based polymer (such as LLDPE, LDPE, or a combination thereof); and
(3) optionally, a third layer in contact with the second layer, the third layer containing a third ethylene-based polymer (such as LLDPE, LDPE, or a combination thereof); and
the multilayer film has one, some, or all of the following properties:
  (i) the first layer has a coefficient of friction (COF) from 0.01, or 0.05, or 0.10, or 0.20, or 0.25 to 0.27, or 0.28, or 0.29, or 0.30, or 0.35; and/or
  (ii) the first layer has a thickness from 5 µm, or 8 µm, or 10 µm to 15 µm, or 20 µm, or 25 µm, or 30 µm, or 35 µm, or 40 µm, or 45 µm, or 50 µm; and/or
  (iii) the first layer is from 10 vol %, or 15 vol %, or 20 vol % to 25 vol %, or 30 vol %, or 40 vol %, or 50 vol %, or 60 vol %, or 70 vol %, or 80 vol %, or 90 vol %, or 95 vol % of the multilayer film, based on the total volume of the multilayer film; and/or
  (iv) the second layer has a thickness from 5 µm, or 8 µm, or 10 µm, or 15 µm, or 20 µm, or 25 µm, or 30 µm to 35 µm, or 40 µm, or 45 µm, or 50 µm, or 55 µm, or 60 µm, or 65 µm, or 70 µm, or 75 µm, or 80 µm; and/or
  (v) the second layer is from 10 vol %, or 15 vol %, or 20 vol %, or 25 vol %, or 30 vol %, or 40 vol %, or 50 vol %, or 60 vol % to 65 vol %, or 70 vol %, or 80 vol %, or 90 vol % of the multilayer film, based on the total volume of the multilayer film; and/or
  (vi) the third layer has a thickness from 5 µm, or 8 µm, or 10 µm to 15 µm, or 20 µm, or 25 µm, or 30 µm, or 35 µm, or 40 µm, or 45 µm, or 50 µm; and/or
  (vii) the third layer is from 10 vol %, or 15 vol %, or 20 vol % to 25 vol %, or 30 vol %, or 40 vol %, or 50 vol %, or 60 vol %, or 70 vol %, or 80 vol %, or 90 vol %, or 95 vol % of the multilayer film, based on the total volume of the multilayer film; and/or
  (viii) the multilayer film has a thickness of from 15 µm, or 20 µm, or 25 µm, or 30 µm, or 35 µm, or 40 µm, or 45 µm, or 50 µm to 55 µm, or 60 µm, or 65 µm, or 70 µm, or 75 µm, or 80 µm, or 85 µm, or 90 µm, or 95 µm, or 100 µm.

In an embodiment, the multilayer film includes at least two layers, or at least three layers, including, consisting essentially of, or consisting of:
(1) a first layer containing, consisting essentially of, or consisting of
  (A) from 80 wt %, or 85 wt %, or 90 wt % to 93 wt %, or 94 wt %, or 95 wt %, or 96 wt %, or 97 wt %, or 98 wt %, or 99 wt % ethylene-based polymer selected from an ethylene plastomer/elastomer, a LDPE, and combinations thereof, based on the total weight of the first layer;
  (B) from 0.4 wt %, or 0.5 wt %, or 1.0 wt %, or 1.5 wt %, or 1.8 wt % to 2.0 wt %, or 2.3 wt %, or 2.5 wt %, or 2.8 wt %, or 3.0 wt %, or 3.5 wt %, or 4.0 wt % slip agent blend, based on the total weight of the first layer; and
  (C) optionally, from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt % additive (such as an antiblock agent), based on the total weight of the first layer; and
the slip agent blend contains:
  (i) from 55 wt %, or 60 wt %, or 65 wt %, or 70 wt %, or 75 wt % to 80 wt %, or 85 wt %, or 90 wt %, or 95 wt %, or 98 wt %, or 99 wt % of a first PDMS (such as a dimethylhydroxysilyl terminated PDMS) having a Mn from 30,000 g/mol, or 40,000 g/mol, or 45,000 g/mol, or 48,000 g/mol to 49,000 g/mol, or 50,000 g/mol, or 55,000 g/mol, based on the total weight of the slip agent blend; and (ii) from 1 wt %, or 2 wt %, or 5 wt %, or 10 wt %, or 15 wt %, or 20 wt % to 25 wt %, or 30 wt %, or 35 wt %, or 40 wt %, or 45 wt % of a second PDMS (such as a dimethylvinylsilyl terminated PDMS) having a Mn from 320,000 g/mol, or 330,000 g/mol, or 340,000 g/mol, or 350,000 g/mol to 360,000 g/mol, or 370,000 g/mol, or 380,000 g/mol, or 390,000 g/mol, or 400,000 g/mol, or 450,000 g/mol, or 500,000 g/mol, or 550,000 g/mol, or 600,000 g/mol, or 750,000 g/mol, or 1,000,000 g/mol, based on the total weight of the slip agent blend;

(2) a second layer in contact with the first layer, the second layer containing a second ethylene-based polymer (such as LLDPE, LDPE, or a combination thereof); and (3) optionally, a third layer in contact with the second layer, the third layer containing a third ethylene-based polymer (such as LLDPE, LDPE, or a combination thereof); and the multilayer film has one, some, or all of the following properties:

(i) the first layer has a coefficient of friction (COF) from 0.01, or 0.05, or 0.10, or 0.20, or 0.25 to 0.27, or 0.28, or 0.29, or 0.30, or 0.35; and/or (ii) the first layer has a thickness from 5 μm, or 8 μm, or 10 μm to 15 μm, or 20 μm; and/or (iii) the first layer is from 10 vol %, or 15 vol %, or 20 vol % to 25 vol %, or 30 vol %, or 40 vol %, of the multilayer film, based on the total volume of the multilayer film; and/or (iv) the second layer has a thickness from 10 μm, or 15 μm, or 20 μm, or 25 μm, or 30 μm to 35 μm, or 40 μm, or 45 μm, or 50 μm, or 55 μm, or 60 μm, or 65 μm, or 70 μm, or 80 μm; and/or (v) the second layer is from 15 vol %, or 20 vol %, or 25 vol %, or 30 vol %, or 40 vol %, or 50 vol %, or 60 vol % to 70 vol %, or 80 vol %, or 90 vol % of the multilayer film, based on the total volume of the multilayer film; and/or (vi) the third layer has a thickness from 5 μm, or 8 μm, or 10 μm to 15 μm, or 20 μm; and/or (vii) the third layer is from 10 vol %, or 15 vol %, or 20 vol % to 25 vol %, or 30 vol %, or 40 vol % of the multilayer film, based on the total volume of the multilayer film; and/or (viii) the multilayer film has a thickness of from 20 μm, or 30 μm, or 40 μm, or 50 μm to 55 μm, or 60 μm, or 65 μm, or 70 μm, or 75 μm, or 80 μm, or 85 μm, or 90 μm, or 95 μm, or 100 μm.

It is understood that the sum of the components in each of the layers disclosed herein, including the foregoing layers, yields 100 weight percent (wt %), based on the total weight of the respective layer. It is also understood that the sum of the volume of each of the layers disclosed herein, including the foregoing layers, yields 100 volume percent (vol %), based on the total volume of the total multilayer film.

In an embodiment, the film excludes a migratory slip agent, such as an unsaturated fatty acid amide (e.g., erucamide and oleamide).

The multilayer film may be (i) a coextruded multilayer structure, (ii) a laminate, or (iii) a combination of (i) and (ii). Some methods, for example, used to construct films are by cast coextrusion or blown coextrusion methods, adhesive lamination, extrusion lamination, thermal lamination, and coatings such as vapor deposition. Combinations of these methods are also possible. In an embodiment, the multilayer film is a coextruded film.

In an embodiment, the film is not an oriented film. In a further embodiment, the film is not biaxially oriented. In other words, the film is not stretched after extrusion in some embodiments.

The present disclosure also provides an article containing the film, or further the multilayer film, such as a package. Nonlimiting examples of suitable packages include food packages and specialty packages (e.g., stand-up pouches, pillow pouches, and trays wrapped in film).

By way of example, and not limitation, some embodiments of the present disclosure will now be described in detail in the following Examples.

EXAMPLES

Materials used in the examples are provided in Table 1A below.

TABLE 1A

| Material/Description | Properties | Source |
|---|---|---|
| AFFINITY ™ PL 1880G (ethylene/1-octene copolymer) (plastomer/elastomer) | MI (I2)(190° C./2.16 kg) = 1.0 g/10 min, Density = 0.902 g/cc, Melting point = 99° C. | The Dow Chemical Company |
| AFFINITY ™ PL 1881G (750 ppm fatty acid amide slip agent and 2500 ppm silica antiblock agent dispersed in an ethylene/α-olefin copolymer (plastomer/elastomer)) | MI (I2)(190° C./2.16 kg) = 1.0 g/10 min, Density = 0.904 g/cc, Melting point = 100° C. | The Dow Chemical Company |
| DOWLEX ™ NG 5056G (ethylene/1-octene copolymer) (LLDPE) | MI (I2)(190° C./2.16 kg) = 1.1 g/10 min, Density = 0.919 g/cc | The Dow Chemical Company |
| DOW ™ LDPE 320E (LDPE) | MI (I2)(190° C./2.16 kg) = 1.0 g/10 min, Density = 0.925 g/cc | The Dow Chemical Company |
| MB25-502 Masterbatch (25 wt % dimethylhydroxysilyl terminated PDMS (PDMS A) dispersed in LDPE A) | LDPE A MI (I2)(190° C./2.16 kg) = 8.0 g/10 min, PDMS A Mn = 48,400 g/mol, PDMS A Mw = 120,100 g/mol, PDMS A Mw/Mn = 2.48 | Dow Corning |

TABLE 1A-continued

| Material/Description | Properties | Source |
|---|---|---|
| MB50-002 Masterbatch (50 wt % dimethylvinylsilyl terminated PDMS (PDMS B) dispersed in LDPE B) | LDPE B MI (I2)(190° C./2.16 kg) = 8.0 g/10 min, PDMS B Mn = 356,700 g/mol[1], PDMS B Mw = 647,266 g/mol[1], PDMS B Mw/Mn = 1.82[1] | Dow Corning |
| MB25-035 Masterbatch (25 wt % dimethylvinylsilyl terminated PDMS (PDMS C) dispersed in LDPE C) | LDPE C MI (I2)(190° C./2.16 kg) = 2.3 g/10 min, PDMS C Mn = 356,700 g/mol[1], PDMS C Mw = 647,266 g/mol[1], PDMS C Mw/Mn = 1.82[1] | Dow Corning |

[1]Based on the average of three samples.

Multilayer film samples are fabricated on a Collin coextrusion line with the conditions of Table 1B.

TABLE 1B

| Parameter | Collin Line Value | Units |
|---|---|---|
| Average Thickness | 50 | μm |
| B.U.R. | 2.5 | |
| Die Diameter | 60 | mm |
| Die gap | 1.8 | mm |
| Temperature profile-Extruder A | 180-220-230-240 | ° C. |
| Temperature profile-Extruder B | 185-210-235-235 | ° C. |
| Temperature profile-Extruder C | 200-220-235-240 | ° C. |
| Temperature, Die | 230 | ° C. |
| Corona Treatment | 40 | Dyne |
| Output Rate | 22 | kg/h |
| Layer Distribution Ratio | 20:60:20 | A:B:B |

The layer configurations are provided below in Table 2. Each multilayer film structure is formed with a first layer having a volume that is 20 volume % of the multilayer film, a second layer having a volume that is 60 volume % of the multilayer film, and a third layer having a volume that is 20 volume % of the multilayer film. The first layer is a skin layer that is a sealant layer. The second layer is a core layer. The third layer is a skin layer. The multilayer film has the following structure: first layer/second layer/third layer. The first layer is in direct contact with the second layer, and the second layer is in direct contact with the third layer. In Table 2, "CS" refers to Comparative Sample.

Each PDMS is included in the first layer as part of a masterbatch (MB25-502, MB50-002, or MB25-035) in which the PDMS is dispersed in a LDPE matrix. Table 2 provides the individual amounts of each PDMS and LDPE matrix included in the first layer. For example, the first layer of Example 1 includes 1.5 wt % of the PDMS A from MB25-502 (which has a Mn of 48,400 g/mol, as provided in Table 1A) and 4.5 wt % of the LDPE A from MB25-502, based on the total weight of the first layer. Thus, the first layer of Example 1 contains a total amount of 6.0 wt % MB25-502, based on the total weight of the first layer. The first layer of Example 1 also includes 0.5 wt % of the PDMS B from MB50-002 (which has a Mn of 356,700 g/mol, as provided in Table 1A) and 0.5 wt % of the LDPE B from MB50-002, based on the total weight of the first layer. Thus, the first layer of Example 1 contains a total amount of 1.0 wt % MB50-002, based on the total weight of the first layer.

The multi layer film samples are tested for COF. The results are provided below in Table 2.

TABLE 2

| | CS 1 | CS 2 | CS 3 | CS 4 | CS 5 | Ex 1 | Ex 2 | CS 6 | CS 7 |
|---|---|---|---|---|---|---|---|---|---|
| First Layer (20 vol %) | | | | | | | | | |
| AFFINITY™ PL 1880G (wt %)[A] | 95.6 | 91.6 | 91.6 | 93.6 | 91.6 | 92.6 | 91.6 | 91.6 | — |
| AFFINITY™ PL 1881G (wt %)[A] (includes 0.075 wt %[D] fatty acid amide and 0.25 wt %[D] silica) | — | — | — | — | — | — | — | — | 100 |
| LDPE A (wt %)[A] (from MB25-502) | — | — | 6.0 | 3.0 | 3.0 | 4.5 | 4.5 | 1.5 | — |
| LDPE B (wt %)[A] (from MB50-002) | 2.0 | — | — | 1.0 | — | 0.5 | — | — | — |
| LDPE C (wt %)[A] (from MB25-035) | — | 6.0 | — | — | 3.0 | — | 1.5 | 4.5 | — |
| PDMS A (wt %)[A] (from MB25-502) | — | — | 2.0 | 1.0 | 1.0 | 1.5 | 1.5 | 0.5 | — |
| PDMS B (wt %)[A] (from MB50-002) | 2.0 | — | — | 1.0 | — | 0.5 | — | — | — |
| PDMS C (wt %)[A] (from MB25-035) | — | 2.0 | — | — | 1.0 | — | 0.5 | 1.5 | — |
| Talc (wt %) | 0.4 | 0.4 | 0.4 | 0.4 | 0.4 | 0.4 | 0.4 | 0.4 | — |
| Second Layer (60 vol %) | | | | | | | | | |
| DOWLEX™ NG 5056G (wt %)[B] | 70 | 70 | 70 | 70 | 70 | 70 | 70 | 70 | 70 |
| DOW™ LDPE 320E (wt %)[B] | 30 | 30 | 30 | 30 | 30 | 30 | 30 | 30 | 30 |
| Third Layer (20 vol %) | | | | | | | | | |
| DOWLEX™ NG 5056G (wt %)[C] | 70 | 70 | 70 | 70 | 70 | 70 | 70 | 70 | 70 |
| DOW™ LDPE 320E (wt %)[C] | 30 | 30 | 30 | 30 | 30 | 30 | 30 | 30 | 30 |
| Film Thickness (μm) | 50 | 50 | 50 | 50 | 50 | 50 | 50 | 50 | 50 |
| First Layer Slip Agent Blend | | | | | | | | | |
| total wt % slip agent blend[+] | 2.0 | 2.0 | 2.0 | 2.0 | 2.0 | 2.0 | 2.0 | 2.0 | 0 |
| wt % "low Mn" PDMS[−] | 0 | 0 | 100 | 50 | 50 | 75 | 75 | 25 | 0 |

TABLE 2-continued

|  | CS 1 | CS 2 | CS 3 | CS 4 | CS 5 | Ex 1 | Ex 2 | CS 6 | CS 7 |
|---|---|---|---|---|---|---|---|---|---|
| w % "high Mn" PDMS~ | 100 | 100 | 0 | 50 | 50 | 25 | 25 | 75 | 0 |
| PDMS Ratio* | 0:2 | 0:2 | 2:0 | 1:1 | 1:1 | 3:1 | 3:1 | 1:3 | N/A |
| First Layer COF | 0.650 | 0.700 | 0.640 | Blocked# | Blocked# | 0.242 | 0.263 | 0.389 | 0.530 |

[A] wt % based on the total weight of the First Layer.
[B] wt % based on the total weight of the Second Layer.
[C] wt % based on the total weight of the Third Layer.
[D] wt % based on the total weight of AFFINITY ™ PL 1881G.
+Total wt % slip agent refers to the total amount of slip agent present in First Layer, based on the total weight of the First Layer.
~wt % of PDMS with a Mn from 30,000 g/mol to less than 300,000 g/mol, based on the total weight of slip agent in the First Layer.
=wt % of PDMS with a Mn from 300,000 g/mol to 2,000,000 g/mol, based on the total weight of slip agent in the First Layer.
*PDMS Ratio = first PDMS with a Mn from 30,000 g/mol to less than 300,000 g/mol (low Mn PDMS):second PDMS with a Mn from 300,000 g/mol to 2,000,000 g/mol (high Mn PDMS)
A "blocked" sample is one where the force required to slide the sledge while measuring COF is higher than the weight of the sledge. In otherwords, a blocked sample has a COF greater than (>) 0.700.

As shown, comparative sample films with a first layer containing (A) an ethylene-based polymer (AFFINITY™ PL 1880G and LDPE) and (B) a single slip agent (CS 1, CS2, CS 3)—rather than a slip agent blend—exhibit a high COF (0.640-0.700).

Moreover, a comparative sample film with a first layer containing (A) an ethylene-based polymer (AFFINITY™ PL 1880G and LDPE) and (B) a slip agent blend containing (i) less than 50 wt % of a first PDMS having a Mn from 30,000 g/mol to less than 300,000 g/mol (PDMS A from MB25-502); and (ii) greater than 50 wt % of a second PDMS having a Mn from 300,000 g/mol to 2,000,000 g/mol (PDMS B from MB50-002 or PDMS C from MB25-035), based on the total weight of the slip agent blend (CS 6) exhibits a high COF (0.389). Likewise, comparative sample films with a first layer containing (A) an ethylene-based polymer (AFFINITY™ PL 1880G and LDPE) and (B) a slip agent blend containing (i) 50 wt % of a first PDMS having a Mn from 30,000 g/mol to less than 300,000 g/mol (PDMS A from MB25-502); and (ii) 50 wt % of a second PDMS having a Mn from 300,000 g/mol to 2,000,000 g/mol (PDMS B from MB50-002 or PDMS C from MB25-035), based on the total weight of the slip agent blend (CS 4, CS 5) blocked. A blocked film is one where the force required to slide the sledge while measuring COF is higher than the weight of the sledge. In other words, a blocked film has a COF greater than (>) 0.700.

Furthermore, a comparative sample film with a first layer containing (A) an ethylene-based polymer (AFFINITY™ PL 1880G and LDPE) and (B) a migratory slip agent (a fatty acid amide) (CS 7) exhibits a high COF of 0.530.

Applicant surprisingly found that a film with a first layer containing (A) an ethylene-based polymer (AFFINITY™ PL 1880G and LDPE) and (B) a slip agent blend, the slip agent blend containing (i) from greater than 50 wt % to 99 wt % of a first PDMS having a Mn from 30,000 g/mol to less than 300,000 g/mol (PDMS A from MB25-502); and (ii) from 1 wt % to less than 50 wt % of a second PDMS having a Mn from 300,000 g/mol to 2,000,000 g/mol (PDMS B from MB50-002 or PDMS C from MB25-035), based on the total weight of the slip agent blend (Ex. 1 and Ex. 2) advantageously exhibits a coefficient of friction (COF) of less than 0.35, and further less than 0.30.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A multilayer film comprising:
a first layer void of a fatty acid amide, the first layer comprising (A) from 90 wt % to 99 wt % of a first ethylene-based polymer consisting of (i) ethylene and (ii) optional $C_3$-$C_{10}$ α-olefin comonomer and a second ethylene-based polymer consisting of (i) ethylene and (ii) optional $C_3$-$C_{10}$ 60 -olefin comonomer;
(B) from 0.5 wt % to 2.5 wt % of a slip agent blend comprising
(i) from 60 wt % to 90 wt % of a first polydimethylsiloxane having a number average molecular weight (Mn) from 30,000 g/mol to 70,000 g/mol, and
(ii) from 40 wt % to 10 wt % of a second polydimethylsiloxane having a number average molecular weight (Mn) from 300,000 g/mol to 2,000,000 g/mol, wherein wt % for (B) (i) and (B) (ii) is based on the total weight of the slip agent blend;
(C) from 0 wt % to 1.0 wt % of an antiblock agent;
a second layer in contact with the first layer, the second layer comprising a third ethylene-based polymer wherein the first polydimethylsiloxane has an Mw/Mn from 2.1 to 3.0 and the second polydimethylsiloxane has a Mw/Mn from 1.5 to 1.9.

2. The multilayer film of claim 1 wherein the multilayer film is void of a fatty acid amide.

3. The multilayer film of claim 1 wherein the first layer has a coefficient of friction (COF) from 0.01 to 0.35 as measured according to ISO 8295.

4. The multilayer film of claim 3 wherein the first ethylene-based polymer consists of (i) ethylene and (ii) $C_3$-$C_{10}$ α-olefin comonomer and the second ethylene-based polymer consists of (i) ethylene.

5. The multilayer film of claim 1, wherein the first polydimethylsiloxane has a Mn from 30,000 g/mol to less than 50,000 g/mol, and the second polydimethylsiloxane has a Mn from 300,000 g/mol to 550,000 g/mol.

6. The multilayer film of claim 5 wherein the first polydimethylsiloxane and the second polydimethylsiloxane are selected from the group consisting of dimethylhydroxysilyl terminated polydimethylsiloxane, dimethylvinylsilyl terminated polydimethylsiloxane, and combinations thereof.

7. The multilayer film of claim 1, wherein the second layer is in direct contact with the first layer.

8. The multilayer film of claim 1 comprising from 0.01 wt % to 0.5 wt % of an antiblock agent selected from the group consisting of silica, talc, calcium carbonate, and combinations thereof.

9. The multilayer film of claim 1 comprising a third layer in contact with the second layer, the third layer comprising a fourth ethylene-based polymer.

10. A multilayer film comprising:
a first layer comprising
(A) from 90 wt % to 99 wt % of a first ethylene-based polymer consisting of (i) ethylene and (ii) optional $C_3$-$C_{10}$ α-olefin comonomer and a second ethylene-based polymer consisting of (i) ethylene and (ii) optional $C_3$-$C_{10}$ α-olefin comonomer;
(B) from 0.5 wt % to 2.5 wt % of a slip agent blend comprising
(i) from 60 wt % to 90 wt % of a first polydimethylsiloxane having a number average molecular weight (Mn) from 30,000 g/mol to 250,000 g/mol and an Mw/Mn from 2.1 to 3.0, and
(ii) from 40 wt % to 10 wt % of a second polydimethylsiloxane having a number average molecular weight (Mn) from 300,000 g/mol to 2,000,000 g/mol and an Mw/Mn from 1.5 to 1.9, wherein wt % for (B) (i) and (B) (ii) is based on the total weight of the slip agent blend;
(C) from 0.01 wt % to 1.0 wt % of an antiblock agent;
a second layer in contact with the first layer, the second layer comprising a third ethylene-based polymer; and
the multilayer film is void of a fatty acid amide.

11. The multilayer film of claim 10 wherein the first layer has a coefficient of friction (COF) from 0.01 to 0.35 as measured according to ISO 8295.

12. The multilayer film of claim 11 wherein the first ethylene-based polymer consists of (i) ethylene and (ii) $C_3$-$C_{10}$ α-olefin comonomer and the second ethylene-based polymer consists of (i) ethylene.

\* \* \* \* \*